United States Patent [19]

Phillips et al.

[11] 3,935,269

[45] Jan. 27, 1976

[54] COPOLYMERS OF N-SUBSTITUTED AZIRIDINES AND EPOXIDES EPISULFIDES

[75] Inventors: Prella M. Phillips; Clarence R. Dick, both of Lake Jackson; Joseph M. Baggett, Freeport, all of Tex.

[73] Assignee: The Dow Chemical Company, Midland, Mich.

[22] Filed: Jan. 11, 1974

[21] Appl. No.: 432,791

Related U.S. Application Data

[63] Continuation of Ser. No. 846,263, July 30, 1969, abandoned.

[52] U.S. Cl. ......... 260/584 B; 106/163 R; 252/357; 260/2 BP; 260/2 EN; 260/45.9 R; 260/78 SC; 260/79; 260/209 R; 260/212; 260/231 R; 260/239 E; 260/348 R; 260/652.5 P
[51] Int. Cl.² ................ C07C 135/00; C08G 65/26
[58] Field of Search...... 260/2 EN, 2 BP, 79, 239 E, 260/584 B, 348 R

[56] References Cited
UNITED STATES PATENTS

| | | | |
|---|---|---|---|
| 2,272,489 | 2/1942 | Ulrich | 260/2 EN |
| 2,296,225 | 9/1942 | Ulrich | 260/2 EN |
| 3,335,116 | 8/1967 | Rosenthal et al. | 260/79 |
| 3,579,488 | 5/1971 | Jones et al. | 260/79 |

*Primary Examiner*—Harold D. Anderson
*Attorney, Agent, or Firm*—L. Wayne White; Chessie E. Rehberg

[57] ABSTRACT

Novel copolymers are prepared in the novel process comprising copolymerizing an N-substituted aziridine with a vicinal epoxide or episulfide. Compounds having at least one active hydrogen, such as water or an alcohol, may be advantageously included as coreactants in the process. The structure of the copolymers, exclusive of any chain-extending or terminal groups, is defined by alternating ring-opened units of the N-substituted aziridine monomer and the epoxide or episulfide monomer. The copolymers are useful as stabilizers for chlorinated solvents, rubber cure accelerators, antioxidants, surfactants, lubricants, acid scavengers, dye-retention aids, retention aids for starch, and as flocculants.

13 Claims, No Drawings

COPOLYMERS OF N-SUBSTITUTED AZIRIDINES AND EPOXIDES EPISULFIDES

This is a continuation of application Ser. No. 846,263 filed July 30, 1969, now abandoned.

BACKGROUND OF THE INVENTION

Previous attempts to copolymerize aziridines (ethylenimines) and vicinal epoxides or episulfides, including both the substituted and nonsubstituted monomers, have been generally unsuccessful in that the reaction product was not an alternating copolymer but was rather a mixture of homopolymers, or a polyalkylenimine having pendant hydroxyalkyl groups, as illustrated by: (1) Y. Oshiro et al., Chem. Abstracts, 64: 14291b; 64: 14292c; and 66: 19069p; (2) C. G. Overberger et al., Journal of Polymer Science: Part A. Vol. 2, 2481 (1964); O. C. Dermer, Wright Air Development Center(WADC) Technical Report 55-447(1956), Publication Board (PB) 121,796. Generally a catalyst, such as $BF_3$, was considered essential in the reaction.

SUMMARY OF THE INVENTION

This invention relates to novel copolymers and a novel process for their preparation. The process is herein referred to as an "oxamination reaction" or "thiamination reaction," the difference between the two being an epoxide is used as a reactant in the oxamination reaction and an episulfide reactant is used in the thiamination reaction.

The novel process comprises reacting by contacting an N-substituted aziridine of the formula (I) 

with a vicinal epoxide or episulfide of the formula (II) 

wherein X is oxygen or sulfide, R is an inert organic group and $R_1$–$R_8$ are H or inert organic groups, the preferred compounds being those wherein R is an inert hydrocarbon group; $R_1$, $R_2$, $R_3$ and $R_4$ are hydrogen, alkyl, aryl or aralkyl groups, at least two of them being hydrogen; $R_5$, $R_6$, $R_7$ and $R_8$ are hydrogen, alkyl, aryl, alkaryl, aralkyl, alkenyl, alkoxyalkyl, alkenyloxyalkyl or $R_6$ and $R_7$ join to form a five or six membered cycloalkyl group, at least two of them being hydrogen. With the provision that when R is a hydrocarbon group of at least six carbon atoms, the process is conducted at a temperature of at least about 130°C and the process comprises the additional step of recovering a waterinsoluble copolymer. Optionally, a compound bearing at least one active hydrogen, hereinafter referred to as a coreactant, is included in the process. Such coreactants are compounds such as water, alcohols, carboxylic acids, thiols, amines, and the like. The backbone structure of the novel copolymers, exclusive of any chain-extending or terminal group, is characterized by alternating ring-opened units of said aziridine monomer and epoxide or episulfide monomer. The copolymers are useful as stabilizers for chlorinated solvents, rubber cure accelerators and antioxidants, surfactants, lubricants, acid scavengers, dye-retention aids, retention aids for starch, and as flocculants.

The novel copolymers are unique in that the backbone structure consists essentially of alternating ring-opened units of the aziridine monomer and the epoxide or episulfide monomer. To wit, the copolymer backbone, exclusive of any chain-extending or terminal groups, contains the repeating copolymer unit $+CR_1R_2-CR_3R_4-N(R)-CR_5R_6-CR_7R_8-X+$,  (III)

wherein the values for X, R and $R_1$–$R_6$ are as defined above. The copolymer unit may be repeated up to 1,000 times or more. In some instances, the copolymer chain may be interrupted or terminated by the residue of an optionally included coreactant; said residue being derived by the removal of active hydrogen, i.e., replaceable hydrogen, from said coreactant. A coreactant can therefore be advantageously included to provide a desired terminal group or a chain-extending group in the backbone of the linear polymers, and, polyfunctional coreactants having three or more active sites can be used to obtain branched polymers. When a coreactant is present in the process, the polymeric product is represented by the general structural formula $Z\{(B-AB)_m-Y\}_n$, or $Z\{(AB)_m-Y\}_n$, wherein Z is the coreactant residue derived by the removal of n active hydrogens from a coreactant; AB is one copolymer unit having formula (III) above; A is a ring-opened unit of aziridine monomer; B is one ring-opened unit of epoxide or episulfide monomer; Y is hydrogen or $-CR_1R_2-CR_3R_4-NHR$; $m$ is an integer between 1 and about 1000 or more; and $n$ is an integer of at least 1 and is equal to the number of active hydrogen abstracted from the coreactant. Most generally, Y is hydrogen.

Reactants

A coreactant in the subject process is, in general, any compound having one or more active hydrogen atoms, i.e., hydrogens which are replaceable under the process conditions and are generally active in the Zerewitinoff Reaction.

Suitable coreactants are compounds such as the alcohols, aliphatic polyols, phenols, alkanolamines, primary or secondary amines, polyalkylenepolyamines, polyalkylenimines, amides, polyamides, thiols, carboxylic acids having a $K_a$ value less than $6.5 \times 10^{-2}$, oxyalkylated derivatives prepared by condensing alkylene oxides onto any of the above compounds, natural products, and also organic compounds such as water, hydrogen sulfide and ammonia.

A coreactant in the process in at least trace amounts is preferred.

Suitable coreactants therefore include:

a. alcohols such as alkanols having one to about 25 carbon atoms, e.g., methanol, ethanol, isopropanol, t-butanol, cyclohexanol, 3-octanol, β-phenethyl alcohol, 1-dodecanol and 1-octadecanol; alkenols having up to about 20 carbon atoms, such as allyl alcohol, crotyl alcohol, methylvinyl carbinol, linoleyl alcohol; alkynols having up to about 10 carbon atoms such as propargyl alcohol, 1-pentyn-5-ol, 4-octyn-2-ol; alkoxy- and aroxy-substituted alcohols such as 2-methoxyethanol, 2-isobutoxyethanol, 2-phenoxyethanol, 1-(2-butoxyethoxy)-2-propanol, 1-isobutoxy-2-propanol, 1-methoxy-2-propanol;

b. aliphatic polyols such as ethylene glycol, propylene glycol, butylene glycol, 1,3-dihydroxyhexane, sucrose, glucose, sorbitol, pentaerythritol, glycerol, and oxyalkylated derivatives of such polyols, polyethylene glycol, polypropylene glycol, polybutylene glycol, alkyl or aryl mono-ethers of such polyalkylene glycols, e.g., polyethylene glycol phenyl ether and polypropylene glycol propyl ether, polyvinyl alcohol, polyepichlorohydrin, copolymers of ethylene and allyl alcohol or β-hydroxyethylacrylate;

c. phenols such as phenol, nonylphenol, resorcinol, hydroquinone, 1,3,5-trihydroxybenzene, 4-(methylthio) phenol, o-chlorophenol, thiophenol, 2-ethylthiophenol, p-nitrophenol, o-phenylphenol, 4-bromophenol, 2,4,5-trichlorophenol, o- or p-cresol, and polyphenols such as p,p'-isopropylidenediphenol (bisphenol A), and the novolac resins which are the condensation products of phenol and formaldehyde;

d. alkanolamines such as mono-, di- and triethanolamine, mono-, di- and tripropanolamine, N,N,N'N'-tetraethanolethylenediamine, N,N-dipropanolethanolamine;

e. primary and secondary amines such as aniline, butylamine, octadecylamine, allylamine, diethyleneamine, cyclohexylamine, ethylenediamine, propylenediamine, and butylenediamine;

f. polyalkylenepolyamines and polyalkylenimines such as diethylenetriamine, triethylenetetramine, dipropylenetriamine, tripropylenetetramine, dibutylenetriamine, and polymeric condensation products of alkylene dihalides and alkylene diamines, e.g., the reaction product of ethylenediamine and 1,3-dichloropropane, and polymers on up to polyethylenimine, polypropylenimine or polybutylenimine having a molecular weight of about 1 million or more.

g. amides such as formamide, acetamide, benzamide, N-methylbenzamide, acrylamide, methacrylamide, stearamide and polyamides such as nylon and polyacrylamide;

h. thiols such as methyl mercaptan, octyl mercaptan, and sulfur-containing polymers such as polyethylenesulfide and polypropylenesulfide.

i. carboxylic acids such as benzoic, acrylic, methacrylic, adipic, acetic, heptanoic, stearic, tall oil, tall oil acids, rosin, oleic, linoleic, lactic, glycine, polyacrylic, polymethacrylic, p-chlorobenzoic, 2,4-dimethylbenzoic, citric, coal tar acids and naphthenic acid, and polymers containing terminal carboxy groups such as carboxy-terminated polybutadienes and polyesters, copolymers of ethylene and acrylic acid; and j. natural products such as the carbohydrates, sugars, cellulose, starch, proteins, gums, and derivatives of such products so long as an active hydrogen is available, such as methylcellulose.

Presently preferred organic coreactants are the aliphatic alcohols, polyols, carboxylic acids, and oxalkylated polyols derived by condensing alkylene oxide of two to four carbon atoms onto such aliphatic alcohols and polyols.

Water is the presently preferred inorganic coreactant. The effect of water on the oxamination or thiamination process is quite pronounced, eg., the rate of reaction increases and the molecular weight of the copolymer decreases as one increases the amount of water in the reaction mixture. Water is suitably included in the process in amounts up to about 35 mole percent, based on (a) the moles of aziridine (when a molar excess of epoxide or episulfide is used), or (b) the moles of epoxide or episulfide (when a molar excess of aziridine is used). At higher concentrations, i.e., above about 35 mole percent, alkanolamines or mercaptoalkyleneamines are formed and homopolymerization of the aziridine and/or the epoxide or episulfide monomers occurs. Accordingly care should be taken to control the amount of water in the process system and reactants.

Mixtures of inorganic and/or organic coreactants may be used if desired. Typical mixtures of coreactants comprise water and another coreactant.

Suitable N-substituted aziridine reactants in the subject process have the structural formula

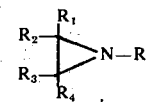

wherein a. R is suitably any inert organic group, i.e., any group that remains inert during the reaction. R is accordingly a hydrocarbon or a hydrocarbon whose chain is (1) interrupted by an oxygen, sulfur or tertiary nitrogen atom, or (2) which is joined to another inert hydrocarbon group through an ester linkage, or (3) which is terminated by an N,N-disubstituted carbamoyl or cyano group, or (4) acyl group.

R is therefore suitably alkyl; aryl; cyano-, halo- or nitro-substituted aryl; alkenyl; aralkyl; alkaryl; cyanoalkyl; cycloalkyl; a five or six membered heterocyclicalkyl group wherein the hetero atom is oxygen, sulfur or a tertiary nitrogen; acyl, i.e.,

wherein E is alkyl, aryl, alkaryl, aralkyl or alkoxy; alkoxyalkyl; aroxyalkyl; or any of the above inert hydrocarbon groups joined to another inert hydrocarbon group through an ester linkage; R preferably has one to about 25 carbon atoms and most preferably has one to about 10 carbon atoms.

R is preferably alkyl, alkenyl, aralkyl, cyanoalkyl, heterocyclicalkyl wherein the hetero atom is oxygen or tertiary nitrogen, or acrylic or methacrylic esters of N-(2-hydroxyalkyl)aziridine.

b. $R_1$, $R_2$, $R_3$, and $R_4$ are suitably hydrogen or alkyl having one to about 10 carbon atoms, at least two of them being hydrogen. Preferably $R_2$, $R_3$ and $R_4$ are each hydrogen and $R_1$ is hydrogen, methyl or ethyl. Most preferably, each or $R_1$, $R_2$, $R_3$ and $R_4$ is hydrogen.

Examples of suitable N-substituted aziridine reactants include: N-alkylaziridines such as, N-ethyl, -isopropyl, -n-butyl, -3-hexyl, cyclohexyl, -n-decyl, -n-dodecylaziridines; N-alkenylaziridines such as, N-allyl, -crotyl, -methallyl, and -11-undecenylaziridines; N-aryl and N-alkarylaziridines such as, N-phenyl, N-naphthyl, -p-tolyl and -3,5-dimethylphenylaziridines; N-aralkylaziridines such as, N-benzyl, -phenethyl, -tolylbutyl, -3,5-dimethylphenethylaziridines; N-cyanoalkyl or N-cyanoarylaziridines such as, N-2-cyanoethyl, -10-cyanodecyl, -p-cyanophenylaziridines; N-heterocyclicalkylaziridines such as, N-2-(N-morpholino)ethyl, -8-(N-morpholino)octyl, -2-(N-piperidino)butyl, -4-(N-piperidino)dodecyl, -6-(N-pyrrolyl)hexyl, -2-(N-pyrrolidinyl)propyl, -1-(tetrahydrofurfuryl), -1-(2-thienyl methyl), and -1-[2(2-pyridyl)ethyl] aziridines; N-acylaziridines such as, N-acetyl, -butyryl, -benzoyl, -3,5-dimethylbenzoyl, -3-phenylpropionyl, -acrylyl, crotonyl, -methoxyformyl and methacrylaziridines; N-alkoxyalkyl, and N-aroxyalkyl aziridines such as, N-butoxyethyl, -ethoxyethyl, -n-hexoxyethyl, -2-propoxypropyl, -4-heptoxybutyl, -2-phenoxyethyl, and -p-methylphenoxy-n-butylaziridines; N-aziridinylalkyl esters such as, 2-(1-aziridinyl)ethyl, 4-(1-aziridinyl)butyl or 2-(2-methyl-1-aziridinyl)ethyl acetate, 2-(1-aziridinyl) ethyl butyrate, 2-(1-aziridinyl)propyl or 6-(2,2-dimethyl-1-aziridinyl)hexyl benzoate, octyl 2-(1-aziridinyl) acetate, ethyl 4-(1-aziridinyl)butyrate, decyl 4-(1-aziridinyl) butyrate, propyl 3-(1-aziridinyl)-propionate, 2-(1-aziridinyl)ethyl acrylate or methacrylate; and the corresponding N-substituted 2-methyl, 2,3-dimethyl, 2-n-butylaziridines and other like compounds.

Suitable vicinal epoxide or episulfide reactants in the subject process have the structural formula

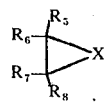

wherein X is oxygen or sulfur and $R_5$, $R_6$, $R_7$ and $R_8$ are hydrogen, alkyl, aryl, aralkyl, alkaryl, alkenyl, alkoxyalkyl, aryloxyalkyl or alkenyloxyalkyl, at least two of them being hydrogen. Preferred epoxides or episulfides are those wherein $R_6$, $R_7$, and $R_8$ are each hydrogen and $R_5$ is hydrogen or a hydrocarbon group having one to about 20 carbon atoms. The most preferred epoxides are ethylene, propylene, butylene and styrene oxides, and glycidyl ethers such as allyl glycidyl ether and phenyl glycidyl ether. The epoxides are currently preferred over the episulfides.

Examples of suitable vicinal epoxides and episulfides include the epoxides and episulfides of ethylene, propylene, 1,2-butylene, 2,3-butylene, 1,2-decylene, 2,3-octylene, cyclopentene, cyclohexene, styrene, naphthylethylene, 4-phenyl-1,2-butylene; the glycidyl ethers, such as ethyl glycidyl ether, butyl glycidyl ether, decyl glycidyl ether, phenyl glycidyl ether, tolyl glycidyl ether, allyl glycidyl ether, crotyl glycidyl ether and methallyl glycidyl ether, and the corresponding sulfur analogs of such compounds.

Mixtures of aziridine monomers may suitably be included in the process with one or more epoxide and/or episulfide monomers. The product obtained is a copolymer having alternating ring-opened units of aziridine and epoxide or episulfide monomers with a random placement of particular aziridine monomers or particular epoxide or episulfide monomers in the product.

Should a copolymer having "block" characteristics be desired, the result is effected by treating one of the subject copolymers as a coreactant and further reacting the copolymer with another monomer of aziridine and/or another monomer of epoxide or episulfide. Thus, the copolymer of N-ethylaziridine and ethylene oxide could be further reacted under the subject process conditions with monomers of N-phenethylaziridine and propylene sulfide to give a product having the structural formula

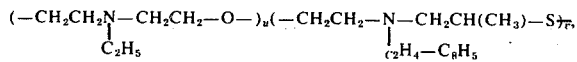

wherein $u$ and $v$ are integers of 1 to about 1,000 or more.

The chain length of the copolymer is variable, and is found to vary in an inverse manner with the amount of coreactant in the process. Accordingly, copolymers having the longest copolymer chain segments are obtained when little or no coreactant is present. When the coreactant is present in a major amount, i.e., more than about 0.2 equivalents of active hydrogen per mole of aziridine, epoxide or episulfide monomer, based on whichever monomer is present in the lesser amount, then oligomers of the copolymer are produced which contain an average of 1 to about 10 copolymer units. By using a substantial excess of coreactant, compounds can be produced which contain as few as one copolymer unit per active hydrogen or less since not every active hydrogen need be replaced by a copolymer chain segment, particularly in such polyfunctional coreactants as polyvinylalcohol, polyalkylene glycols, polyalkylenepolyamines and carbohydrates.

The chain length of the copolymer can be easily extended by using a polyfunctional coreactant. Thus, when water, methanol or ethylene glycol is present, the copolymer is substantially linear. When coreactants such as glycerol are used, a copolymer is obtained which is branched, each of the three chains being attached to the glycerol residue and being terminated on the other end with hydroxyl groups or amino groups, depending on which monomer supplies the terminal groups. Typically, the terminal group is a hydroxyl group.

Reaction Conditions

Surprisingly, substantially any molar ratio of N-substituted aziridine to epoxide or episulfide reactant can be used in the subject reaction since under suitable conditions the copolymer is found unexpectedly to terminate when one of the reactants is depleted. A suitable ratio, based on convenience and economy is between about 20:1 and 1:20 of N-substituted aziridine:epoxide. A preferred ratio is between about 4:1 and 1:4.

A reaction temperature is suitably selected between about 25°C. and about 300°C. When substantially no coreactant is present in the process, a temperature between about 100°C. and 200°C. is preferred. When a coreactant is present in more than trace amounts, however, the preferred temperature may vary from the lower end of the temperature range to the higher end depending upon (a) concentration of coreactant; (b) reactivity of the coreactant; and (c) the reactivity of each of the aziridine, epoxide and episulfide monomers.

The reaction rate increases in proportion to the amount of coreactant, and with the reactivity of the aziridine, epoxide and episulfide monomers.

The relative reactivities of the monomers and the relative reactivities of the coreactants is generally well known. For example, ethylene oxide is known to be more reactive than propylene oxide or butylene oxide; N-ethylaziridine is known to be more reactive than N-decylaziridine; C-substituted aziridines are generally less reactive than the corresponding unsubstituted homologs; and carboxylic acids are known to be more reactive than alcohols; hence, the more reactive the compounds used in the process and the higher the concentration of coreactant, the lower the reaction temperature may be to achieve a given rate of polymerization. In accordance with the above, a preferred temperature for the faster reactions, based on convenience and economy, is between about 50°C. and about 120°C., and for the slower reactions the preferred temperature is above 100°C. and below about 250°C.

The reactants should be maintained in contact one with the other(s) until the desired copolymer is obtained. A suitable reaction time may vary from a few hours to a few days depending upon the reaction temperature and reactivity of the aziridine and epoxide reactants. Typically, a reaction time of 6 to 48 hours is sufficient and therefore preferred.

The reaction pressure is such as to keep the reaction mixture substantially liquid and is suitably atmospheric or superatmospheric. Atmospheric or autogenous pressure is preferred.

The reaction can be run neat or in an inert solvent, such as benzene, toluene, xylene, and the like.

The reaction can be run as a batch process wherein all ingredients are mixed simultaneously, or as a continuous process wherein reactants and/or coreactant(s) are fed continuously or incrementally into the system. In either process, the polymeric product can be treated as a coreactant in further oxamination or thiamination reactions since it contains at least one active hydrogen which can be abstracted to form a site on which another copolymer chain segment can be attached.

The physical state of the copolymers varies from a low viscosity fluid to solid, and other physical properties, such as solubility, likewise vary in accordance with molecular weight, functionality and the substituents on the initial reactants. Accordingly, the products can be tailored to fit a multitude of needs by simply varying the choice and proportions of reactants and/or coreactant.

All of the copolymers have the common property of containing basic amino nitrogens and divalent atoms of oxygen or sulfur in their backbones.

Some of the copolymers may have a tendency to discolor upon aging. Such discoloration can be substantially inhibited in the liquid products by adding a stabilizing amount of an antioxidant, such as sodium borohydride, hydrazine or hydrazine hydrate to the copolymer.

SPECIFIC EMBODIMENTS

The following examples further illustrate the invention:

A General Procedure

Charge the N-substituted aziridine and vicinal epoxide or episulfide into an autoclave equipped for agitation. Seal the autoclave, heat to the desired reaction temperature and maintain the reactants at such conditions of temperature and pressure with mixing until the desired reaction product is formed. Remove the volatile components under reduced pressure, and recover the product.

When a coreactant is used, the above procedure is followed except that the coreactant is generally charged with the aziridine and epoxide or episulfide reactants. The order of addition of the coreactant is not important.

The copolymer products were analyzed by one or more of the following analytical methods: gas-liquid partition chromatography (GLPC), infrared (IR), nuclear magnetic resonance (NMR) and gel permeation chromatography (GPC).

EXAMPLE 1

Reaction Between N-Ethylaziridine and Propylene Oxide

Using the above general procedure, N-ethyl-aziridine (EtAz) and propylene oxide (PO) were reacted together at various reaction temperatures and times to give copolymers. Trace amounts of water were present in the monomers (100 to 700 p.p.m.), the autoclave was stainless steel or glass and the pressure was autogenous. The results are tabulated in Table I.

TABLE I

| No. | EtAz (g.) | PO (g.) | Temperature (°C.) | Time (Hours) | Copolymer (g.) | $\eta$ at 25°C. (cks) |
|---|---|---|---|---|---|---|
| 1 | 24.0 | 82.2 | 175 | 22.0 | 36.1 | liquid |
| 2 | 24.0 | 82.2 | 130 | 22.0 | 33.4 | 752 |
| 3 | 24.0 | 82.2 | 130 | 46.5 | 40.2 | 855 |
| 4 | 24.0 | 82.2 | 130 | 138.5 | 41.1 | 740 |
| 5 | 48.0 | 41.1 | 130 | 22.0 | 39.6 | 660 |
| 6 | 48.0 | 41.1 | 130 | 90.0 | 70.8 | 1318 |
| 7 | 75.0 | 20.6 | 130 | 20.0 | 13.0 | 608 |
| 8 | 24.0 | 82.2 | 100 | 21.0 | 10.6 | liquid |
| 9 | 48.0 | 41.1 | 100 | 21.0 | 9.7 | liquid |
| 10 | 24.0 | 410.0 | 175 | 22.0 | 43.3 | liquid |

The above copolymers were fluids ranging in color from light yellow to amber. They were soluble in benzene, ethanol, acetone, n-hexane, $CCl_4$, and insoluble in water. Regardless of the mole ratio of the reaction epoxy and aziridine monomers, the copolymer product always contained approximately equal molar amounts of each reactant. Table IA shows the mole ratio of reactants used and the mole ratio of nitrogen to oxygen found in the resulting copolymers of Example 1, Experiments 1–10.

TABLE I-A

| No. | Mole Ratio EtAZ:PO | Mole Ratio N:O Found |
|---|---|---|
| 1 | 1:4 | 0.98 |
| 2 | 1:4 | 1.05 |
| 3 | 1:4 | 1.08 |
| 4 | 1:4 | 0.96 |
| 5 | 1:1 | 1.13 |
| 6 | 1:1 | 1.10 |
| 7 | 3:1 | 1.10 |
| 8 | 1:4 | 1.07 |
| 9 | 1:1 | 1.09 |
| 10 | 1:21 | 0.91 |

EXAMPLE 2

Reactions Between Other Aziridine and Epoxide Monomers

Using substantially the same equipment and procedure set forth in Example 1, other aziridine and epoxide monomers were reacted. The results are tabulated in Table II.

TABLE II

| No. | Aziridine (g.) | Epoxide (g.) | Temperature (°C.) | Time (Hrs.) | Copolymer (g.) | $\eta$ at 25°C. (cks) |
|---|---|---|---|---|---|---|
| 1 | EtAz-160.5 | EO-66.0 | 120 | 48 | 165.3 | 650 |
| 2 | DecylAz-9.7 | PO-2.9 | 130 | 22 | 4.2 | liquid |
| 3 | AllylAz-16.1 | PO-11.5 | 130 | 88 | 16.6 | liquid |
| 4 | AcetylAz-24.9 | PO-17.3 | 130 | 88 | 24.9 | viscous |
| 5 | CyEtAz-33.1 | PO-41.1 | 100 | 21 | 19.1 | viscous |
| 6 | EtAz-24.0 | Mix-I-64.0 | 130 | 88 | 25.6 | liquid |
| 7 | MoEtAz-93.6 | PO-69.6 | 120 | 48 | 123.0 | 8784 |
| 8 | PhEtAz-104.3 | PO-20.6 | 130 | 69 | 64.1 | 6664 |
| 9 | EtAz-75.0 | AGE-48.2 | 130 | 24 | 79.3 | 1082 |
| 10 | EtAz-75.0 | Mix-II-43.7 | 130 | 21 | 84.5 | 1737 |
| 11 | AzEtAcet-100.0 | PO-41.0 | 130 | 20 | 77.7 | 192 |
| 12 | EtAz-75.0 | CPO-48.6 | 200 | 20.5 | 42.6 | viscous |
| 13 | EtAz-75.0 | StyOx-71.3 | 174 | 20.5 | 108.9 | viscous |

In Table II, and hereinafter, the following abbreviations are used: EtAz = N-ethylaziridine; DecylAz = N-decylaziridine; AllylAz = N-allylaziridine, AcetylAz = N-acetylaziridine; CyEtAz = N-(2-cyano)ethylaziridine; MoEtAz = N-(2-morpholino)ethylaziridine; PhEtAz = N-phenethylaziridine; AzEtAcet = 2-(1-aziridinyl) ethyl acetate; EO = ethylene oxide; PO = propylene oxide; Mix-I = "Nedox" 1114 — a commercially available product which is a mixture of $C_9$ to $C_{12}$ hydrocarbons having 1,2-epoxy groups; Mix-II = 20.5 g. PO and 2.32 g. EO; AGE = allyl glycidyl ether; CPO = cyclopentene oxide; and StyOx = Styrene oxide.

The above copolymers had N/O molar ratios substantially the same as predicted by theory.

The solubility of the copolymers in various solvents was determined and is reported below:

| No. | Solvents |
|---|---|
| 1 | water, ethanol, acetone, ethylene glycol, hexane $CCl_4$ |
| 2 | (water insoluble) |
| 3 | ethanol, acetone, and benzene (water insoluble) |
| 4 | water, ethanol, acetone |
| 5 | acetone (insoluble in water, ethanol or benzene) |
| 6 | ethanol, benzene (insoluble in water or acetone) |
| 7 | not determined |
| 8 | acetone, benzene (insoluble in water or ethanol) |
| 9 | ethanol, acetone benzene (water insoluble) |
| 10 | ethanol, acetone, benzene |
| 11 | ethanol, acetone, benzene (water insoluble) |
| 12 | acetone, benzene (water insoluble) |
| 13 | acetone, n-hexane (water insoluble) |

EXAMPLE 3

Effect of Water

Using substantially the procedure and equipment set forth in Example 1, the effect of water in the reaction was determined and the results tabulated in Table III.

The reaction conditions of 130°C., autogenous pressure, and 20 hrs. were held constant. One mole of N-ethylaziridine was used in each experiment.

TABLE III

| No. | PO(mole) | Water (mole) | Yield (Wt.%)* | $\eta$ at 25°C. (cks) |
|---|---|---|---|---|
| 1 | 0.22 | 0.010 | 27 | 549 |
| 2 | 0.22 | 0.028 | 61 | 194 |
| 3 | 0.34 | 0.011 | 28 | 608 |
| 4 | 0.30 | 0.037 | 66 | 210 |
| 5 | 0.34 | 0.064 | 96 | 157 |
| 6 | 0.67 | 0.038 | 63 | 428 |
| 7 | 1.05 | 0.011 | 45 | 660 |
| 8 | 1.05 | 0.052 | 67 | 428 |
| 9 | 1.05 | 0.094 | 80 | 251 |
| 10 | 1.05 | 0.175 | 93 | 128 |
| 11 | 4.19 | 0.015 | 77 | 752 |
| 12 | 4.19 | 0.098 | 91 | 245 |
| 13 | 4.19 | 0.181 | 93 | 125 |
| 14 | 4.19 | 0.344 | 97 | 66 |

*"Wt.%" yield based on 100% conversion of aziridine or epoxide monomer, whichever was in the lesser molar amount.

EXAMPLE 4

Oxamination Reaction in the Presence of Alcohols

Using substantially the same equipment and procedure set forth in the General Procedure, several experiments were conducted between N-ethylaziridine, ethylene or propylene oxide, and various alcohols as coreactants. The results are tabulated in Table IV.

TABLE IV

| No. | EtAz (g.) | Epoxide (g.) | Coreactant (g.) | Temp. (°C.) | Time (Hrs.) | Copolymer (g.) | $\eta$ at 25°C. (cks) |
|---|---|---|---|---|---|---|---|
| 1 | 56.3 | PO, 41.1 | Eg, 3.1 | 175 | 11 | 89.6 | 312 |
| 2 | 56.3 | PO, 41.1 | Eg, 6.2 | 175 | 6 | 89.3 | 108 |
| 3 | 75.0 | EO, 36.5 | diEg, 1.0 | 175 | 23 | 86.1 | 1148 |
| 4 | 75.0 | EO, 44.2 | diEg, 10.0 | 173 | 20 | 104.9 | 236 |
| 5 | 56.3 | PO, 41.1 | Gly, 8.9 | 175 | 22 | 89.6 | 241 |
| 6 | 56.3 | PO, 41.1 | TEA, 15.3 | 200 | 6 | 100.2 | 235 |
| 7 | 56.3 | PO, 41.1 | PgME, 5.4 | 175 | 46 | 85.2 | 222 |
| 8 | 56.3 | PO, 41.1 | EgPE, 5.3 | 175 | 48 | 84.1 | 425 |
| 9 | 37.5 | PO, 82.2 | E-300, 10.2 | 130 | 2 | 36.0 | 123 |
| 10 | 37.5 | PO, 82.2 | E-300, 10.1 | 130 | 22.2 | 67.8 | 281 |
| 11 | PhEtAz, 1495.4 | PO, 584.7 | E-300, 240.0 | 153 | 22 | 2046.7 | 8049 |
| 12 | 37.5 | PO, 41.1 | P-400, 39.8 | 177 | 6 | 101.9 | 118 |
| 13 | 315.0 | PO, 233.7 | CP-3000, 200.0 | 180 | 20 | 2456.0 | 514 |

TABLE IV-continued

| No. | EtAz (g.) | Epoxide (g.) | Coreactant (g.) | Temp. (°C.) | Time (Hrs.) | Copolymer (g.) | η at 25°C. (cks) |
|---|---|---|---|---|---|---|---|
| 14 | 210.0 | PO, 155.8 | CP-4100, 1888.0 | 180 | 5 | 2125.2 | 658 |
| 15 | 75.0 | PO, 41.0 | PVA, 10.1 | 105 | 20 | 77.5 | viscous |
| 16 | AEM, 49.8 | PO, 82.0 | CH$_3$OH, 0.4 | 100 | 21 | 38.8 | viscous |
| 17 | 375.0 | EO, 217.4 | Oct, 34.1 | 145 | 5 | 579.2 | 283 |
| 18 | 367.5 | EO, 214.0 | Dodec, 49.1 | 174 | 5 | 591.5 | 303 |
| 19 | 322.5 | EO, 189.5 | Octadec, 62.0 | 168 | 4.5 | 534.0 | 332 |
| 20 | 75.0 | EP, 48.3 | Esso-20, 30.0 | 175 | 20 | 119.5 | viscous |
| 21 | 75.0 | PO, 57.4 | isoprop, 3.5 | 150 | 21 | 108.4 | 296 |
| 22 | 75.0 | PO, 57.4 | t-butyl, 3.9 | 150 | 20 | 112.3 | 346 |
| 23 | 75.0 | EO, 48.0 | MTP, 14.0 | 174 | 22 | 123.1 | 216 |
| 24 | 75.0 | EO, 44.7 | Novo, 30.0 | 152 | 21 | 103.5 | viscous |

In experiments 11 and 16 above, PhEtAz and AEM replaced EtAz as the aziridine reactant. In the above experiments, EO = ethylene oxide; PO = propylene oxide; PhEtAz = N-phenethylaziridine; AEM = 2-(1-aziridinyl)ethyl methacrylate; Eg = ethylene glycol; diEg = diethylene glycol; Gly = glycerol; TEA = triethanol amine; PgME = propylene glycol methyl ether; EgPE = ethylene glycol phenyl ether; E-300 = polyethylene glycol having an average molecular weight of about 300; P-400 = polypropylene glycol having an average molecular weight of 400; CP-3000 = a glycerine initiated polyoxypropylene glycol having an average molecular weight of about 3000; CP-4100 = a glycerine initiated polyoxyalkylene glycol wherein the polyoxyalkylene portion is a heteric mixture of oxyethylene and oxypropylene groups in about a 80:20 to 90:10 molar ratio, respectively, and has an average molecular weight of about 4100; PVA = polyvinylalcohol; Oct = 1-octanol; Dodec = 1-dodecanol; Octadec = 1-octadecanol; "Esso-20" = a commercially available product which is a mixture of higher alcohols predominantly 1-eicosanol; isoprop = isopropanol; t-butyl = t-butanol; MTP = 4-(methylthio)phenol; Novo = a novolac resin having a functionality of about 6.0 to about 6.5.

EXAMPLE 5

Oxamination Reaction in the Presence of Coreactants Other Than Water and Alcohols Using substantially the same equipment and procedure set forth in the General Procedure, several experiments were conducted wherein N-ethylaziridine and propylene oxide were reacted with various representative coreactants. The results are tabulated below.

The product of 9 was washed with water, product of 12 was washed with methanol, and the products of 13, 15 and 16 were washed with benzene to remove any residual reactants.

EXAMPLE 6

Reaction Between N-Phenylaziridine and Ethylene Oxide

Using substantially the same equipment and procedure set forth in Example 1, N-phenylaziridine (12.0 g.) was reacted with ethylene oxide (86.8 g.) for 19 hours at 150°C. under autogenous pressure. The volatiles were removed under reduced pressure yielding 12.7 g. of water-insoluble product. The product had the following elemental analysis based on the repeating unit, (—CH$_2$CH$_2$—N(C$_6$H$_5$)—CH$_2$CH$_2$—O—).

TABLE VI

|  | Theory | Found |
|---|---|---|
| % C | 73.59 | 73.18 |
| % H | 8.02 | 7.87 |
| % N | 8.58 | 9.07 |
| % O | 9.80 | 9.75 |

EXAMPLE 7

Reaction in an Inert Solvent

Using substantially the same equipment and procedure as in Example 1 above, with the exception that 50 ml. of benzene was included as a reaction medium, 37.5 g. of EtAz was reacted with 24.6 g. of PO for 22 hours at 174°C. under autogenous pressure. The liquid product weighed 46.1 g. The product obtained was the same as the copolymers in Example 1.

TABLE V

| No. | EtAz(g.) | PO(g.) | Coreactant (g.) | Temperature (°C.) | Time (hrs.) | Copolymer (g.) | η at 25°C. (cks.) |
|---|---|---|---|---|---|---|---|
| 1 | 75.0 | 53.3 | Benzoic Acid, 12.0 | 42 | 16.0 | 31.5 | liquid |
| 2 | 75.0 | 53.3 | Benzoic Acid, 12.0 | 150 | 16.0 | 117.4 | 265 |
| 3 | 75.0 | 53.3 | Adipic Acid, 15.0 | 43 | 21.5 | 53.7 | 168 |
| 4 | 75.0 | 53.3 | Methacrylic Acid, 25.0 | 44–52 | 19.5 | 49.8 | 268 |
| 5 | 75.0 | 57.4 | Polyepichlorohydrin, 10.2 (MW 2000) | 193 | 5.0 | 93.3 | 465 |
| 6 | 75.0 | 57.4 | n-Butylamine, 7.4 | 175 | 20.0 | 120.4 | 247 |
| 7 | 75.0 | 41.0 | Diethylamine, 7.0 | 175 | 20.0 | 90.0 | 145 |
| 8 | 75.0 | 53.3 | Formamide, 8.8 | 152 | 16.0 | 120.4 | 270 |
| 9 | 75.0 | 53.3 | Acetamide, 6.0 | 175 | 20.0 | 86.7 | liquid |
| 10 | 75.0 | 49.2 | Acrylamide, 10.1 | 176 | 17.0 | 97.1 | 1497 |
| 11 | 63.9 | 52.2 | Stearamide, 84.9 | 140–180 | 3.0 | 168.7 | viscous |
| 12 | 40.6 | 33.2 | Nylon, 34.6 | 160–175 | 1.5 | 36.7 | solid |
| 13 | 11.3 | 8.2 | Sugar, 50.0 | 110 | 5.0 | 28.4 | solid |
| 14 | 1.5 | 0.8 | Cotton Linters, 10.0 | 175 | 16.0 | 11.2 | solid |
| 15 | 5.2 | 2.1 | Cellulose, 18.9 | 130 | 2.5 | 21.1 | solid |
| 16 | 13.7 | 5.6 | Methylcellulose, 49.5 | 115 | 5.0 | 56.0 | solid |
| 17 | 4.4 | 3.6 | Corn Starch, 182.0 | 105 | 4.0 | — | solid |

EXAMPLE 8

Reaction Between N-Ethylaziridine and Propylene Sulfide

Using substantially the same equipment and procedure set forth in Example 1, 67.5 g. of N-ethylaziridine was reacted with 42.1 g. of propylene sulfide for 20 hours at 174°C. under autogenous pressure. The liquid copolymer (41.5 g.) had the following elemental analysis based on the repeating unit, ($-CH_2CH_2-N(C_2H_5)-CH_2CH(CH_3)-S-$).

TABLE VII

|  | Theory | Found |
|---|---|---|
| % C | 54.91 | 55.44 |
| % H | 9.98 | 9.98 |
| % N | 10.67 | 10.34 |
| % S | 24.43 | 22.85 |

EXAMPLE 9

Thiamination Reaction in the Presence of Coreactants

Using substantially the same equipment and procedure set forth in the General Procedure, several experiments were conducted wherein N-ethylaziridine (EtAz) and propylene sulfide (PS) were reacted with various representative coreactants. The results are tabulated below.

TABLE VIII

| No. | EtAz (g.) | PS (g.) | Coreactant (g.) | Temperature (°C.) | Time (Hrs.) | Copolymer (g.) | Physical State of Product |
|---|---|---|---|---|---|---|---|
| 1 | 67.5 | 42.2 | $H_2O$, 0.05 | 173 | 16 | 55.6 | liquid |
| 2 | 75.0 | 56.3 | Benzoic Acid, 12.0 | 150 | 18 | 92.2 | liquid |
| 3 | 75.0 | 56.3 | Adipic Acid, 15.0 | 45 | 22 | 83.9 | liquid |
| 4 | 75.0 | 56.3 | Glycerol, 8.9 | 175 | 17 | 78.1 | liquid |
| 5 | 75.0 | 56.3 | n-Pentanol, 5.0 | 150 | 16 | 90.2 | liquid |

Various representative copolymers were tested as stabilizers for trichloroethylene, in a 48 hr. accelerated oxidation test as described in Federal Specification O-T-634A and MIL-7003. The results were as follows:

TABLE IX

| No. | Stabilizer. % by wt. | Concentration (p.p.m.) of HCl at 8 hrs. | 24 hrs. | 48 hrs. |
|---|---|---|---|---|
| 1 | A, 0.10 | none | none | none |
| 2 | A, 0.05 | none | none | none |
| 3 | A, 0.025 | none | none | 39 |
| 4 | B, 0.10 | none | none | 100 |
| 5 | C, 0.10 | none | none | 26 |
| 6 | D, 0.10 | none | none | none |
| 7 | E, 0.10 | none | none | 10 |
| 8 | F, 0.10 | none | none | none |
| 9 | none | 1800 | 3290 | 4750 |

Stabilizer "A" is the product of Example 1, No. 2; "B" is described in Table II, No. 9; "C" and "D" are described in Table IV. Nos. 13 and 23, respectively; "E" is described in Table V, No. 7; and "F" is described in Table II, No. 11.

Similar stabilization results are obtained by using a stabilizing amount of the same or other copolymers in trichloroethylene, perchloroethylene, methylchloroform, and other like chlorinated solvents.

The subject copolymers, particularly those wherein R is alkyl, alkenyl, aralkyl or cycloalkyl, are useful in the rubber industry as antioxidants and cure accelerators in rubber compositions which are vulcanized by sulfur. For example, the copolymers of (A) N-phenethylaziridine and propylene oxide (trace amounts of water present in reactants), (B) N-ethylaziridine and propylene oxide (trace amounts of water present in reactants), and (C) N-phenethylaziridine and propylene oxide (coreacted with polyethylene glycol having an average molecular weight of about 300 and trace amounts of water present in reactants) were all effective as cure accelerators giving a good rate of cure and unusually good protection to the sample against cure reversion, and as antioxidants at 4.5 parts by weight in the following standard styrene-butadiene rubber (SBR) masterbatch composition:

TABLE X

| Masterbatch Composition | |
|---|---|
| Ingredient | Parts by Weight |
| SBR 1609* | 145.0 |
| Stearic acid | 1.0 |
| Zinc Oxide | 4.0 |
| Paraffin Waxes | 3.5 |
| Sulfur | 2.0 |
| N-t-butyl-2-benzothiazole-sulfenamide | 1.2 |
|  | 156.7 |

*SBR 1609 is a commercially available synthetic rubber.

The rubber masterbatch and test compositions were formulated according to ASTM D 15-66T, cured at 320°F. for periods of 10, 20 and 30 minutes, and tested pursuant to ASTM D 412-66. The test results were:

TABLE XI

| Copoly-mer* | Cure Time, Min. | Physical Properties - Unaged Samples 300% Modulus (p.s.i.) | Tensile (p.s.i.) | Elongation (%) | Hardness Durometer, Shore A |
|---|---|---|---|---|---|
| A | 10 | 870 | 3800 | 680 | 53 |
| A | 20 | 950 | 3130 | 560 | 55 |
| A | 30 | 1000 | 3460 | 580 | 54 |
| B | 10 | 980 | 3830 | 630 | 52 |
| B | 20 | 1070 | 4110 | 640 | 55 |
| B | 30 | 1090 | 3990 | 630 | 55 |
| C | 10 | 860 | 3850 | 670 | 53 |
| C | 20 | 990 | 3950 | 630 | 56 |
| C | 30 | 950 | 3640 | 610 | 57 |
| D | 10 | 970 | 3520 | 650 | 56 |
| D | 20 | 1380 | 3600 | 540 | 60 |

TABLE XI-continued

| Copolymer* | Cure Time, Min. | Physical Properties - Unaged Samples | | | Hardness Durometer, Shore A |
| --- | --- | --- | --- | --- | --- |
| | | 300% Modulus (p.s.i.) | Tensile (p.s.i.) | Elongation (%) | |
| D | 30 | 1440 | 2920 | 460 | 60 |

*Copolymers A, B and C correspond directly to the above description of (A), (B) and (C). D is a blank which has the composition defined in Table X.

The 20-minute cured samples were then aged in air for 72 hours at 212°F. and their physical properties again measured as above. The data is tabulated below.

See ASTM D 573-53 (1965).

TABLE XII

| Copolymer | Physical Properties - Samples Aged in Air | | | Hardness |
| --- | --- | --- | --- | --- |
| | 300% Modulus (p.s.i.) | Tensile (p.s.i.) | Elongation (%) | |
| A | — | 2290 | 280 | 68 |
| B | — | 2370 | 290 | 70 |
| C | 2380 | 3390 | 370 | 68 |
| D | — | 2330 | 260 | 68 |

Similar desirable results are obtained by using an accelerating amount, e.g., 0.05 to about 20 parts by weight, based on 100 parts by weight of rubber, of other copolymers in a vulcanizable rubber composition.

The subject copolymers are protic acid scavengers. Thus, they are useful as acid acceptors in chemical processes and as absorbers for acidic gases. Sulfur dioxide, carbon dioxide and other acidic components can be removed from gas streams by contacting such streams with the copolymers per se or with aqueous or organic solutions thereof.

The dyeability of many synthetic and natural fibers, e.g., cotton, nylons, rayons, etc., is enhanced by first subjecting said fibers to the subject examination process and thereafter dyeing the oxaminated fibers. E.g., a nylon fabric reacted with EtAz and PO to give an oxaminated fabric which was easily dyed when dipped into alcoholic solutions of Eric Green and Eosin Blue. The dyed fabric was stable to an alcohol wash. The untreated nylon fabric did not accept any appreciable amount of the dye.

The retention of starch on cellulose is greatly improved by using an oxaminated starch, i.e., using a starch which has been modified in the subject oxamination reaction. For example, aqueous slurries of (1) the oxaminated starch described in Table V, No. 17, and (2) corn starch (the control) were each stirred for 15 minutes with cellulose fibers from a ground paper filter. The cellulose was filtered from each mixture, and the amount of oxaminated starch or corn starch remaining in the filtrate was determined by a standard iodometric titration. The cellulose retained 93.2 weight percent of the oxaminated starch and only 21.5 weight percent of the corn starch.

Copolymers of N-ethylaziridine, ethylene oxide and a coreactant were tested as surfactants pursuant to test procedures described in ASTM D-1173, D-1331 and D-2281. The copolymers are described in Table IV, Nos. 18 and 19, respectively. The test results are tabulated below.

Other copolymers of the invention are similarly good surfactants.

TABLE XIII

| Coreactant | Surface Tension (dynes/cm) | Interfacial Tension (dynes/cm) | Wetting Time (min.) | Foam Height (mm) 0 | 5 min. | Foam Stability (%) |
| --- | --- | --- | --- | --- | --- | --- |
| 1-dodecanol | 35.6 | 5.3 | 3.7 | 85 | 25 | 29.4 |
| 1-octadecanol | 37.4 | 5.4 | 3.4 | 80 | 40 | 50.0 |

We claim:
1. A process for preparing a liquid or solid copolymer whose backbone consists essentially of alternating ring opened units of
   A. an aziridine of the formula

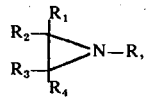

wherein
   1. R is an inert organic group;
   2. $R_1$, $R_2$, $R_3$ and $R_4$ are hydrogen, alkyl aryl or aralkyl groups, at least two of them being hydrogen; and
   B. a vicinal epoxide of the formula

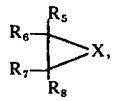

wherein
   1. X is oxygen
   2. $R_5$, $R_6$, $R_7$ and $R_8$ are hydrogen, alkyl, aryl, alkaryl, aralkyl, alkenyl, alkoxyalkyl, alkenyloxyalkyl, or $R_6$ and $R_7$ join to form a five or six membered cycloalkyl group, at least two of them being hydrogen;
said copolymer being water insoluble when R is a hydrocarbon radical of at least six carbon atoms, X is oxygen and $R_1$–$R_8$ are each hydrogen:
   said process comprising reacting by contacting (A) with (B) in liquid phase at a temperature of at least about 130°C;
   provided that when R is a hydrocarbon group of at least six carbon atoms, and $R_1$–$R_8$ are each hydrogen, the process comprises the additional step of recovering a water-insoluble copolymer.
2. The process defined by claim 1 wherein $R_2$, $R_3$ and $R_4$ are each hydrogen.
3. The process defined by claim 1 wherein $R_6$, $R_7$ and $R_8$ are each hydrogen.
4. The process defined by claim 1 wherein R has one to 25 carbon atoms and is an alkyl; aryl; cyano-, halo- or nitro-substituted aryl; alkenyl; aralkyl; alkaryl; cyanoalkyl; cycloalkyl; a 5- or 6-membered heterocyclic alkyl group wherein the hetero atom is oxygen, sulfur, or a tertiary nitrogen; an acyl group having the formula —C(O)—E, wherein E is alkyl, aryl, alkaryl, aralkyl or alkoxy; alkoxyalkyl; or an aroxyalkyl group, or any of the above inert hydrocarbon groups joined to another such group through a carboxylate linkage.

5. The process defined in claim 4 wherein R has from one to 10 carbon atoms, $R_1$–$R_4$ and $R_6$–$R_8$ are each hydrogen, and $R_5$ is hydrogen or a hydrocarbon group having one to 20 carbon atoms.

6. The process defined in claim 5 wherein R is alkyl, alkenyl, aralkyl, cyanoalkyl, heterocyclic alkyl wherein the hetero atom is oxygen or tertiary nitrogen, or a group of the formula —$CH_2CH_2$—O—C(O)—CH=$CH_2$ or —$CH_2CH_2$—O—C(O)—C($CH_3$)=$CH_2$.

7. The process defined in claim 2 wherein $R_2$–$R_4$ and $R_6$–$R_8$ are each hydrogen and $R_5$ is hydrogen methyl or ethyl.

8. The process defined by claim 7 wherein $R_1$ is hydrogen and R is ethyl, cyanoethyl, or phenethyl.

9. The process defined by claim 1 which additionally includes water as a coreactant; said water being present in the process in amounts of from trace amounts to 35 mole percent, based on the moles of (A) or (B), whichever is the lesser and is consumed during the course of the reaction.

10. The process defined in claim 9 wherein the molar ratio of (A) to (B) is between about 20:1 and about 1:20 and wherein the reaction temperature is between about 25°C and about 300°C.

11. The process defined by claim 10 wherein the molar ratio of (A) to (B) is between about 4:1 and about 1:4 and wherein the reaction temperature is between about 100°C and 200°C.

12. The process defined by claim 11 wherein $R_1$–$R_4$ and $R_6$–$R_8$ are each hydrogen; $R_5$ is hydrogen, methyl or ethyl; and R is ethyl, cyanoethyl or phenethyl.

13. The process defined by claim 12 wherein $R_5$ is methyl and R is ethyl.

* * * * *

UNITED STATES PATENT AND TRADEMARK OFFICE
CERTIFICATE OF CORRECTION

PATENT NO. : 3,935,269

DATED : January 27, 1976

INVENTOR(S) : Prella M. Phillips, Clarence R. Dick, and Joseph M. Baggett

It is certified that error appears in the above-identified patent and that said Letters Patent are hereby corrected as shown below:

Title page: The title "COPOLYMERS OF N-SUBSTITUTED AZIRIDINES AND EPOXIDES EPISULFIDES" should read --COPOLYMERS OF N-SUBSTITUTED AZIRIDINES AND EPOXIDES--.

Column 1, line 48: "sulfide," should read --sulfur,--.

Column 1, line 60: "waterin-" should read --water-in- --.

Column 2, line 13: "$R_1-R_6$" should read --$R_1-R_8$--.

Column 2, line 28: "$Z\text{\textlbrackdbl}(B-AB)_m Y]_n$" should read --$Z[B(AB)_m Y]_n$--.

Column 2, line 52: "organic" should read --inorganic--.

Column 3, line 56: "oxalk-" should read --oxyalk- --.

Column 5, line 4: "methacrylaziridines;" should read --methacrylylaziridines;--.

Column 5, line 68: The formula should read as follows:

Column 8, line 49: "reaction" should read --reactant--.

Column 9, line 45: "hexane" at the end of the first line under Solvents should read --hexane,--.

UNITED STATES PATENT AND TRADEMARK OFFICE
CERTIFICATE OF CORRECTION

PATENT NO. : 3,935,269 (Continuation of Corrections from previous page)
DATED : January 27, 1976

INVENTOR(S) : Prella M. Phillips, Clarence R. Dick, and Joseph M. Baggett

It is certified that error appears in the above-identified patent and that said Letters Patent are hereby corrected as shown below:

Column 10, last line on the page, Table IV, last line under Coreactant (g.): "CP-3000,200.0" should read --CP-3000, 2000.0--.

Column 11, line 10, Table IV-continued, under Epoxide (g.) line 7: "EP, 48.3" should read --EO, 48.3--.

Column 11, last line, Table V, last item under Coreactant (g.): "Corn Starch, 182,0" should read --Corn Starch 182.0--

Column 14, line 45, Table X, last line: "1.2" should be deleted from the first column of the table and moved across to the last line of the second column.

Column 14, Table XI, first column, first line: "mer*" should be deleted and added to the column heading making it read --Copolymer*--.

Column 15, line 5, Table XI-continued, first column, first line: "mer*" should be deleted and added to the column heading making it read --Copolymer*--

Column 15, line 45: "examination" should read --oxamination--.

Column 16, line 16, Table XIII, last column heading: "Foam Stability) (%)" should read --Foam Stability (%)--.

Column 16, line 54, Claim 1, line 22: "hydrogen:" should read --hydrogen;--.

Column 17, line 18, Claim 7, line 2: "hydrogen methyl" should read --hydrogen, methyl--.

Signed and Sealed this

Twenty-seventh Day of July 1976

[SEAL]

Attest:

RUTH C. MASON
Attesting Officer

C. MARSHALL DANN
Commissioner of Patents and Trademarks